United States Patent [19]

Wagner, Jr. et al.

[11] Patent Number: 4,488,226

[45] Date of Patent: Dec. 11, 1984

[54] METHOD AND APPARATUS FOR HIGH SPEED ASYNCHRONOUS SERIAL DATA TRANSFER

[75] Inventors: Martin D. Wagner, Jr., Richardson; Phillip A. Mathews, Carrollton, both of Tex.

[73] Assignee: Challenge Systems, Inc., Richardson, Tex.

[21] Appl. No.: 443,945

[22] Filed: Nov. 23, 1982

[51] Int. Cl.³ ............................................. G06F 15/16
[52] U.S. Cl. ................................................... 364/200
[58] Field of Search ........................ 364/200 MS File

[56] References Cited

U.S. PATENT DOCUMENTS 4,357,658 11/1982 van der Ouderaa ............... 364/200

Primary Examiner—Raulfe B. Zache

Attorney, Agent, or Firm—Hubbard, Thurman, Turner & Tucker

[57] ABSTRACT

A method and apparatus for high speed asynchronous serial data transfer between two microprocessors. Each of the two microprocessors is coupled to an asynchronous receiver/transmitter having a request-to-send output and a clear-to-send input. Each asynchronous receiver/transmitter also has a wait/ready output for utilization in conjunction with direct memory access devices or processors. The wait/ready output of a first asynchronous receiver/transmitter is applied to a digital filter to remove transients therein and the filtered signal is then coupled to the clear-to-send input of a second asynchronous receiver/transmitter, enabling the second asynchronous receiver/transmitter to transmit data back to the first asynchronous receiver/transmitter.

7 Claims, 1 Drawing Figure

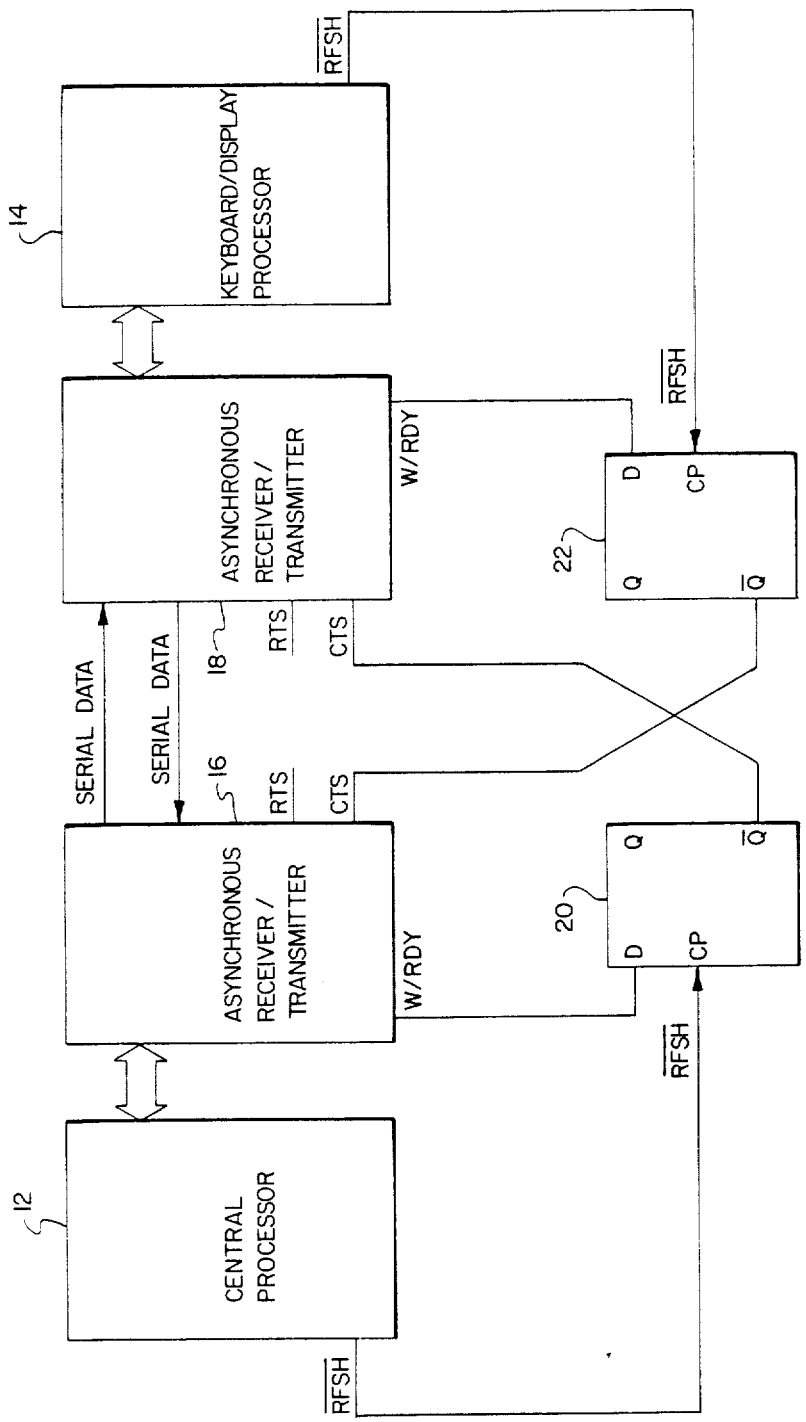

METHOD AND APPARATUS FOR HIGH SPEED ASYNCHRONOUS SERIAL DATA TRANSFER

BACKGROUND OF THE INVENTION

This invention relates generally to methods and apparatus for the serial transfer of digital data between microprocessors and in particular to methods and apparatus for increasing the speed of such serial transfer.

The ubiquitous microprocessor is finding increasing application in every aspect of modern life. A primary problem involved with the utilization of such microprocessors is the transfer of data to and from these devices. This problem is particularly burdensome as microprocessors become more and more powerful and greater and greater amounts of data are required and generated. Indeed, the applications in which more than one microprocessor is utilized, the amount of data being transferred requires that either expensive parallel methods or slow serial methods of communication be utilized.

A particular application in which this problem is readily apparent involves the utilization of two microprocessors in a small computer system. Generally, such dual microprocessor systems utilize one microprocessor to control a cathode ray tube display system and keyboard while a second microprocessor performs main processor duties. In such applications the systems designer is faced with the alternative of an expensive parallel data bus or a relatively slow asynchronous serial bus which is generally limited, depending upon the communications protocol utilized, to approximately 19.2 kilobaud. This relatively slow data rate results in inordinate delays between processor action and display and is generally not acceptable to systems designers.

SUMMARY OF THE INVENTION

It is therefore one object of the present invention to provide an improved method and apparatus for transferring data between two microprocessors.

It is another object of the present invention to provide an improved method and apparatus for the serial transfer of data between two microprocessors.

It is yet another object of the present invention to provide an improved method and apparatus for high speed serial transfer of data between two microprocessors.

The foregoing objects are achieved as is now described. Each of the two microprocessors is coupled to an asynchronous receiver/transmitter having a request-to-send output and a clear-to-send input. Each asynchronous receiver/transmitter also has a wait/ready output for utilization in conjuction with direct memory access devices or processors. The wait/ready output of a first asynchronous receiver/transmitter is applied to a digital filter to remove transients therein and the filtered signal is then coupled to the clear-to-send input of a second asynchronous receiver/transmitter, enabling the second asynchronous receiver/transmitter to transmit data back to the first asynchronous receiver/transmitter.

BRIEF DESCRIPTION OF THE FIGURE

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawing, wherein the sole FIGURE depicts a block diagram of the novel apparatus of the present invention.

DETAILED DESCRIPTION OF THE INVENTION

Referring now to the sole FIGURE, there is depicted a block diagram of the novel apparatus of the present invention. The diagram of this FIGURE includes a central processor 12 and a keyboard/display processor 14; however, those ordinarily skilled in this art will appreciate that the present invention will find application in all systems in which it is desired to communicate between two microprocessor devices over a high speed serial bus regardless of the utilization of the microprocessors. In the preferred mode of operation of the present invention, central processor 12 and keyboard/display processor 14 are standard eight bit microprocessors such as the Z80 manufactured by Zilog, Inc. of Cupertino, Calif.

As is presently the practice in this field, central processor 12 and keyboard/display processor 14 are each coupled to a respective asynchronous receiver/transmitter 16 and 18, which each include two independent full-duplex channels with separate modem controls. Such devices are well known in the art and the preferred mode of the present invention utilizes a Z8470 Z80 DART (Dual Asynchronous Receiver/Transmitter) again manufactured by Zilog, Inc. Asynchronous receiver/transmitters 16 and 18 are each utilized as serial-to-parallel and parallel-to-serial converters and controllers. In prior art applications of this type, parallel data is coupled between each asynchronous receiver/transmitter and its associated microprocessor. Each asychronous receiver/transmitter converts this parallel data to serial data for transmission and converts serial data which is received to parallel data for input to the microprocessor. Such prior art applications utilize the request-to-send (RTS) outputs and the clear-to-send (CTS) inputs to communicate between the two asynchronous receiver/transmitters. The request-to-send (RTS) output of each asynchronous receiver/transmitter is an I/O bit from its associated microprocessor, which requires the microprocessor to examine the status of its associated asynchronous receiver/transmitter periodically to determine whether or not the receiver buffer is fully loaded. In those applications is which the microprocessor must poll other devices during data transfer, it is possible that data can be received despite a full receiver buffer and an "overrun" may occur, resulting in data being lost.

In order to assure that no data is lost due to such overruns, it is common practice to operate the data link between two such asynchronous receiver/transmitters at a sufficiently slow data rate to permit the microprocessor to always poll the asynchronous receiver/transmitter in time to prevent data loss. Typically, utilizing an RS-232 communications protocol, asynchronous data rates are limited to 19.2 kilobaud.

In view of the limitation imposed by the necessity of waiting for a microprocessor to poll its associated asynchronous receiver/transmitter, it would be desirable for an asynchronous receiver/transmitter to be able to generate its own status signal to a second asynchrunuos receiver/transmitter, to prevent data transmission by that second asynchronous receiver/transmitter when its receive buffers are full. However, none of the existing outputs of known asynchronous receiver/transmitters of the Z80 family will accomplish this function.

Certain asynchronous receiver/transmitter, such as the Z8470 Z80 DART, include a wait/ready (W/RDY) output which is designed for utilization with a microprocessor or a direct memory assess (DMA) controller. When programmed for the wait function, this output synchronizes a microprocessor to its data rate by the insertion of wait states into the processor read or write cycles. When programmed for the ready function, this output may be utilized as the ready line to a DMA controller.

The wait/ready output is not suited for use as a control signal to a second asynchronous receiver/transmitter due to the fact that the wait/ready line will drop momentarily each time the asynchronous receiver/transmitter is selected by a mircroprocessor read or write cycle. This becomes a problem in those circumstances in which the microprocessor selects an asynchronous receiver/transmitter to transmit data while that asynchronous receiver/transmitter's receive buffers are full. The aforementioned drop in the wait/ready output can be mistakenly interpreted as an indication that the receive buffer is ready to accept data. Any data transmitted to that asnychronous receiver/transmitter will then cause an overrun and corresponding loss of data.

In order to utilize the wait/ready output of each asynchronous receiver/transmitter as a control signal to a second asynchronous receiver/transmitter, it is necessary to digitally filter this output to remove any transient false signal such as that discussed above. This digital filtering may be accomplished by reclocking the wait/ready output of each asynchronous receiver/transmitter through a D-type bistable multivibrator. In accordance with the present invention, D-type bistable miltivibrators 20 and 22 are coupled to the wait/ready outputs of asynchronous receiver/transmitters 16 and 18 respectively and serve to digitally filter this transient signal out of the wait/ready output. The digital filter function is accomplished by clocking D-type bistable multivibrators 20 and 22 at a clock rate which is slow enough to render these transient signals invisible to the output of the multivibrator. The refresh (RFSH) output of each associated microprocessor is well suited to the puropse of clocking bistable multivibrators 20 and 22.

Utilizing the output of the bistable multivibrator to control the clear-to-send (CTS) input of a second asynchronous receiver/transmitter will allow the data rate to be operated at a sufficiently high rate to substantially increase the transfer rate between asynchronous receiver/transmitter 16 and asynchronous receiver/transmitter 18. This is accomplished without the problem of "overrun", resulting in lost data, yet rendering both microprocessors (12 and 14) free to tend other tasks. Experimentation has demonstrated that the serial data transfer rate can be increased to a minimum of 76.8 kilobaud between asynchronous receiver/transmitter 16 and asynchronous receiver/transmitter 18.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An apparatus for high speed serial data communication between a first and second mircroprocessor comprising:
   a first asynchronous receiver/transmitter coupled to said first microprocessor having at least one output for synchronizing the operation of a microprocessor and at least one input for enabling serial transmission of data by said receiver/transmitter;
   a second asynchronous receiver/transmitter coupled to said second microprocessor having at least one output for synchronizing the operation of a microprocessor and at least one input for enabling serial transmission of data by said second receiver/transmitter;
   first digital filter means coupling said at least one output of said first asynchronous receiver/transmitter to said at least one input of said second asynchronous receiver/transmitter; and
   second digital filter means for coupling said at least one output of said second asynchronous receiver/transmitter to said at least one input of said first asynchronous receiver/transmitter.

2. The apparatus of claim 1 wherein said first and second digital filter means comprise bistable multivibrator devices clocked at a rate sufficiently below the rate of transient variations in said at least one output of said first and second asynchronous receiver/transmitters.

3. The apparatus of claim 2 wherein said bistable multivibrators comprise D-type flip-flop circuits.

4. The apparatus according to claim 2 wherein said bistable multivibrator devices are clocked utilizing a refresh clock signal from said first and second microprocessors.

5. The apparatus according to claim 1 wherein said first and second asynchronous receiver/transmitters include serial-to-parallel and parallel-to-serial converters.

6. A method of high speed serial data communication between a first and second microprocessor, each of which is coupled to an asynchronous receiver/transmitter having at least one output for synchronizing the operation of a micriprocessor and at least one input for enabling transmission by said receiver/transmitter, comprising:
   digitally filtering said at least one output from a first of said asynchronous receiver/transmitters and coupling said digitally filtered at least one output to said at least one input of said second asynchronous receiver/transmitter; and
   digitally filtering said at least one output from a second of said asynchronous receiver/transmitters and coupling said digitally filtered at least one output to said at least one input of said first asynchronous receiver/transmitter.

7. A method of high speed data communication between a first and second microprocessor, each of which is coupled to an asynchronous receiver/transmitter having at least one output for synchronizing the operation of a microprocessor and at least one input for enabling transmission by said receiver/transmitter:
   couping said at least one output from each of said asynchronous receiver/transmitters to a data input of a bistable multivibrator;
   clocking said bistable multivibrator at a rate sufficiently below the rate of transient variations in said at least one output whereby said transient variations are digitally filtered out of said at least one output; and
   coupling an output from each of said bistable multivibrators to said at least one input of a respective asynchronous receiver/transmitter.

* * * * *